United States Patent [19]

Petrucci et al.

[11] Patent Number: 4,882,061
[45] Date of Patent: Nov. 21, 1989

[54] FILTER APPARATUS

[75] Inventors: Raymond M. Petrucci, Middlebury; Edward Giordano, Glastonbury; Bruce Hafner, Killingworth; Bruce G. Taylor, Kensington, all of Conn.

[73] Assignee: Cuno, Incorporated, Meriden, Conn.

[21] Appl. No.: 300,566

[22] Filed: Jan. 23, 1989

[51] Int. Cl.4 .............................................. B01D 13/00
[52] U.S. Cl. ..................... 210/652; 210/136; 210/195.2; 210/257.2
[58] Field of Search .............. 210/195.2, 259, 257.2, 210/652, 651, 654, 641, 136

[56] References Cited

U.S. PATENT DOCUMENTS 3,654,148  4/1972  Bradley ........................... 210/652 X
4,610,790  9/1986  Reti et al. ........................ 210/259 X Primary Examiner—Frank Spear
Attorney, Agent, or Firm—Weingram & Zall

[57] ABSTRACT

A filter apparatus for a home reverse osmosis water system is provided. The apparatus has a head, which has a forward flow inlet port for connection to a reverse osmosis water unit, and which has a reverse flow outlet port for connection to a water service faucet. The apparatus also has a cartridge, which has a twist-on securing means for connection to the head, a filter assembly for filtering forward fluid flow and for filtering reverse fluid flow, and a combination inlet and outlet port for connection to a pressurized water tank. The filter assembly has a primary filter unit, which is disposed in a cartridge primary chamber, and a secondary filter unit, which is disposed in a cartridge secondary chamber, and a valve means, e.g., check valve, which is disposed between the primary chamber and the secondary chamber, whereby forward fluid flow is permitted to flow through the primary filter unit and also through the secondary filter unit, and reverse fluid flow is only permitted to flow through the secondary filter unit.

The foregoing apparatus enables permeate from a reverse osmosis module to pass through the filtration cartridge, first through the primary and then the secondary filter unit, and after storage of the filtrate therefrom, passing the stored filtrate through the secondary filter unit of the filtration cartridge in a reverse direction to the direction the permeate passed through the unit, to filter the water just prior to use.

15 Claims, 3 Drawing Sheets

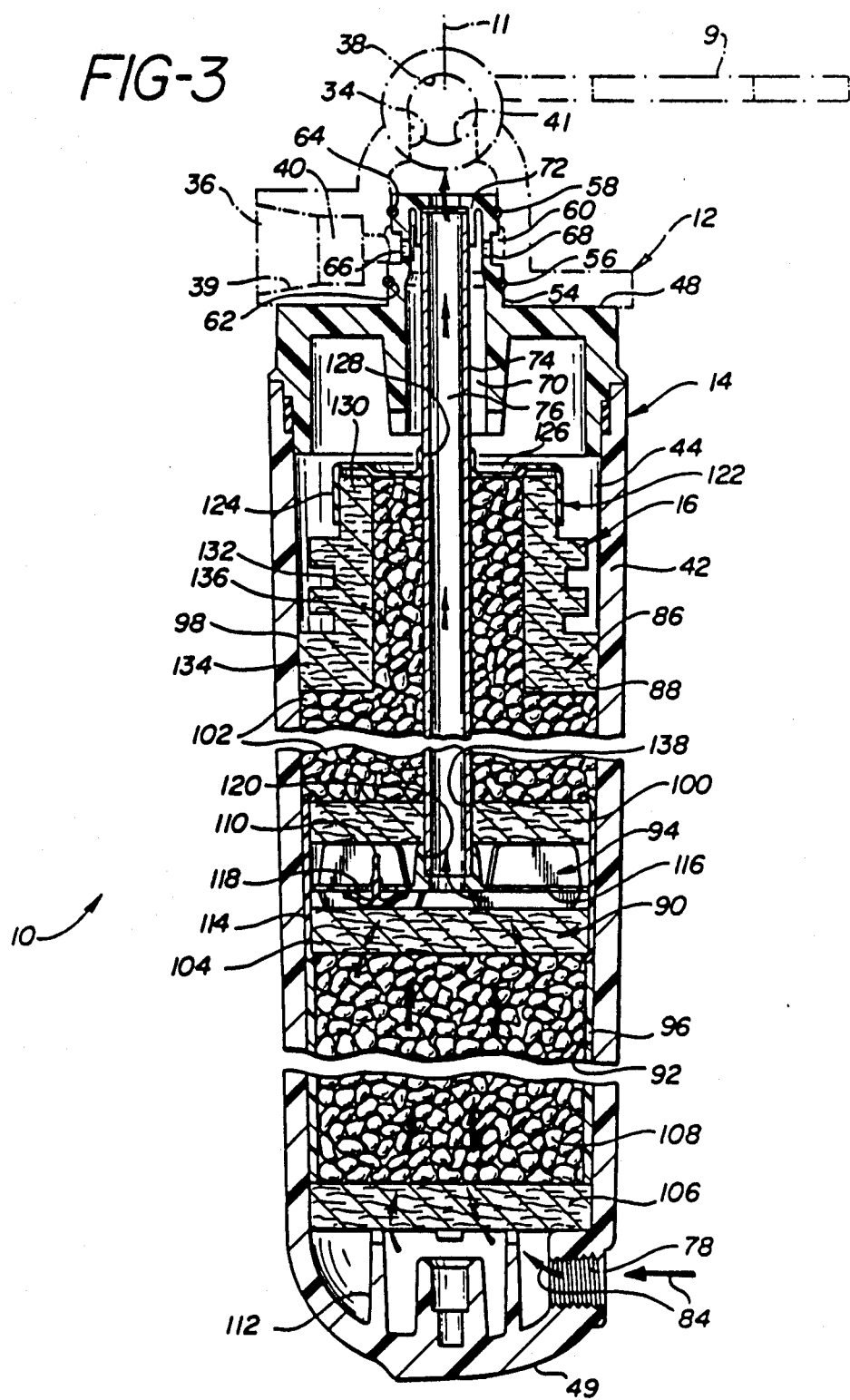

FILTER APPARATUS

This invention relates to a filter apparatus, and in particular to a biodirectional filter apparatus having a multi-stage filter assembly with a check valve subassembly.

BACKGROUND OF THE INVENTION

This invention is preferably used in conjunction with the prior art filter apparatus described in U.S. Pat. No. 4,735,716 to Petrucci et al, which is assigned to the same assignee as this application. Other relevant prior art patents include U.S. patent numbers:
- 3,178,022, to Balogh;
- 3,780,867, to Zirlis;
- 3,799,347, to McDuffie;
- 3,883,428, to Waring;
- 4,029,580, to Lange;
- 4,104,044, to Lange;
- 4,125,469, to Henton, et al.;
- 4,177,145, to Schumacher;
- 4,192,751, to Henton, et al.;
- 4,318,809, to Bethel; and,
- 4,320,000, to Lange, et al.

The prior art filter apparatus, which is described in U.S. Pat. No. 4,735,716, to Petrucci, et al., includes a head, a cartridge, securing means for attaching the cartridge to the head, a filter assembly disposed in the cartridge, an inlet port in the head, and an outlet port in the cartridge, for one-direction flow through the filter assembly. Such a filter apparatus is used in a triple-head structure designed to hold three disposable canisters, e.g. a sediment cartridge, a reverse osmosis (RO) module or cartridge and an activated carbon cartridge. Thus water passing through the apparatus will first be subjected to prefiltering in the sediment filter cartridge. The filtrate then flows to the RO module and is subjected to reverse osmosis filtration to remove dissolved substances and undissolved matter, including bacteria. The permeate from the RO module cartridge will then flow to the activated carbon filter cartridge where dissolved chloride will be removed. The filtrate therefrom is then discharged into a storage tank and is then subsequently used, e.g. for drinking.

A common problem associated with such a system is that upon storage in the storage tank for any appreciable period of time there is a tendency of the tank to impart an unacceptable taste and odor to the water. Typically this is resolved by the installation of an additional final-stage carbon filter between the storage tank and the service faucet. The invention described and claimed herein eliminates the need for a separate final filter in such a system.

U.S. Pat. No. 3,178,022 to Balogh describes a first, forward flow, filter apparatus, and a second, return flow, filter apparatus, each apparatus including a container, and a filter assembly, which is disposed in the container and which has a check valve.

U.S. Pat. No. 3,780,867 to Zirlis describes a one direction, water filter apparatus, which includes a head, a cartridge, securing means, a filter assembly, an inlet port, and an outlet port, wherein the filter assembly includes concentric cylindrical screens with an earth layer therebetween and with charcoal within the inner screen.

U.S. Pat. No. 3,799,347 to MaDuffie describes a bidirectional, oil filter apparatus, which includes a container, two end heads with respective ports, two check valves adjacent to the respective heads, a cylindrical paper filter disposed between the two check valves, for flow in a forward direction, or alternately for flow in a reverse direction.

Prior art U.S. Pat. No. 3,883,428 to Waring describes a one direction, water filter apparatus, which includes a head, a container, a cloth and carbon filter assembly disposed in the container, an inlet port in the head, and an outlet port in the head.

U.S. Pat. Nos. 4,029,580 and 4,104,044 to Lange describe a bidirectional, heat pump filter apparatus, which includes a container, two end heads, two check valves, two filters, two driers, for flow in a forward direction or alternately for flow in a reverse direction.

U.S. Pat. Nos. 4,125,469 and 4,192,751 to Henton, et al describe a bidirectional, heat pump filter apparatus, which includes a container, two end heads, two check valves, a cylindrical fiberglass filter, and two flat end filter pads, for flow in a forward direction or alternately for flow in a reverse direction.

U.S. Pat. No. 4,177,145 to Schumacher describes a bidirectional, heat pump filter apparatus, which includes a container, two end heads, two check valves, alumina filter material, two flat end filter pads, for flow in a forward direction or alternately for flow in a reverse direction.

U.S. Pat. No. 4,318,809 to Bethel describes a bidirectional, heat pump filter apparatus, which includes a container, two end heads, two check valves, a cylindrical fiberglass filter, and two flat end filter pads, for flow in a forward direction, or alternately for flow in a reverse direction.

U.S. Pat. No. 4,320,000 to Lange, et al describes a bidirectional, heat pump filter apparatus, which includes a container, two end heads, four check valves, a cylindrical filter unit having a perforated tube, for flow in a forward direction or alternately for flow in a reverse direction.

SUMMARY OF THE INVENTION

According to the present invention, a filter apparatus is provided, which comprises a head having an inlet port and an outlet port. A filter cartridge is provided having a first end which secures to the head and a second end having a combination inlet and outlet port. A filter assembly is disposed in the cartridge which comprises a primary and a secondary filter unit. A check valve subassembly means is disposed between the primary filter unit and the secondary filter unit to permit forward flow in one direction through both the primary filter unit and the secondary filter unit, and alternately for reverse flow in an opposite direction through the secondary filter unit only. A tube is provided for fluid communication between the secondary filter unit and the outlet port to permit reverse flow thereto.

By use of the filter apparatus of this invention an improved process is provided for purifying impure water to produce drinking water. The process comprises passing the impure water through a reverse osmosis (RO) filter cartridge or module to produce a permeate. Preferably, the water is prefiltered prior to entering the RO module. The permeate from the RO unit then passes sequentially through a primary filter unit and a secondary filter unit contained in a filtration cartridge. The filtrate therefrom is then stored for a period of time and, just prior to use, passed through the secondary filtration unit, preferably in a reverse direction to that of the permeate.

The foregoing filter apparatus and process eliminate the need for an additional filter cartridge just prior to the service spout to remove undesirable taste and odor prior to use and efficiently utilizes the filter media in the filter cartridges used and provides other benefits.

The foregoing and other objects, features and advantages will be apparent from the following description of the preferred embodiment of the invention as illustrated in the accompanying drawings.

BRIEF DESCRIPTION OF THE DRAWINGS

FIG. 3 is a section view corresponding to the section view of FIG. 2 which shows reverse fluid flow.

DESCRIPTION OF THE PREFERRED EMBODIMENT

Figure 1:
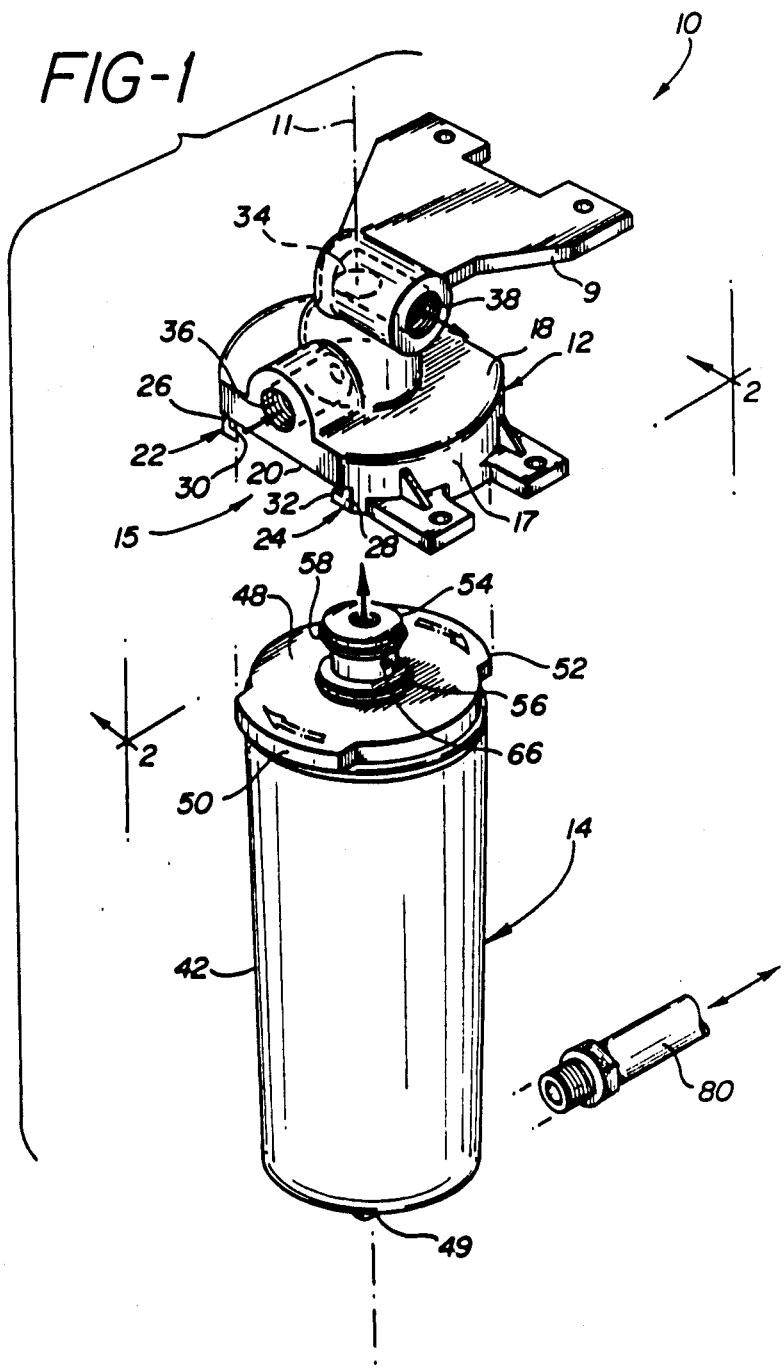
FIG. 1 is perspective view of a filter apparatus according to this invention.

As shown in FIG. 1, a filter apparatus 10 is provided. Apparatus 10 includes an axis 11 and a mounting plate 9. Apparatus 10 also includes a head 12, a disposable cartridge 14, a securing means 15, and a filter assembly 16, (FIGS. 2 and 3) which is disposed in the cartridge 14.

As shown in FIG. 1, head 12 includes a flat plate 17, which has a top surface 18 and which has a bottom surface 20. Securing means 15 includes two tab receptacles 22, 24, which have respective upstanding arcuate walls 26, 28, and which have respective reentrant cam walls 30, 32.

Head 12 also includes an upstanding chamber 34, an inlet, port 36, and an outlet port 38, preferably to a service faucet (not shown). Inlet port 36 has a threaded opening 39 and a passage 40. Outlet port 38 also has a threaded opening 41.

Cartridge 14 includes a peripheral or housing wall 42, which surrounds a cavity 44 that contains the filter assembly 16.

Figure 2:
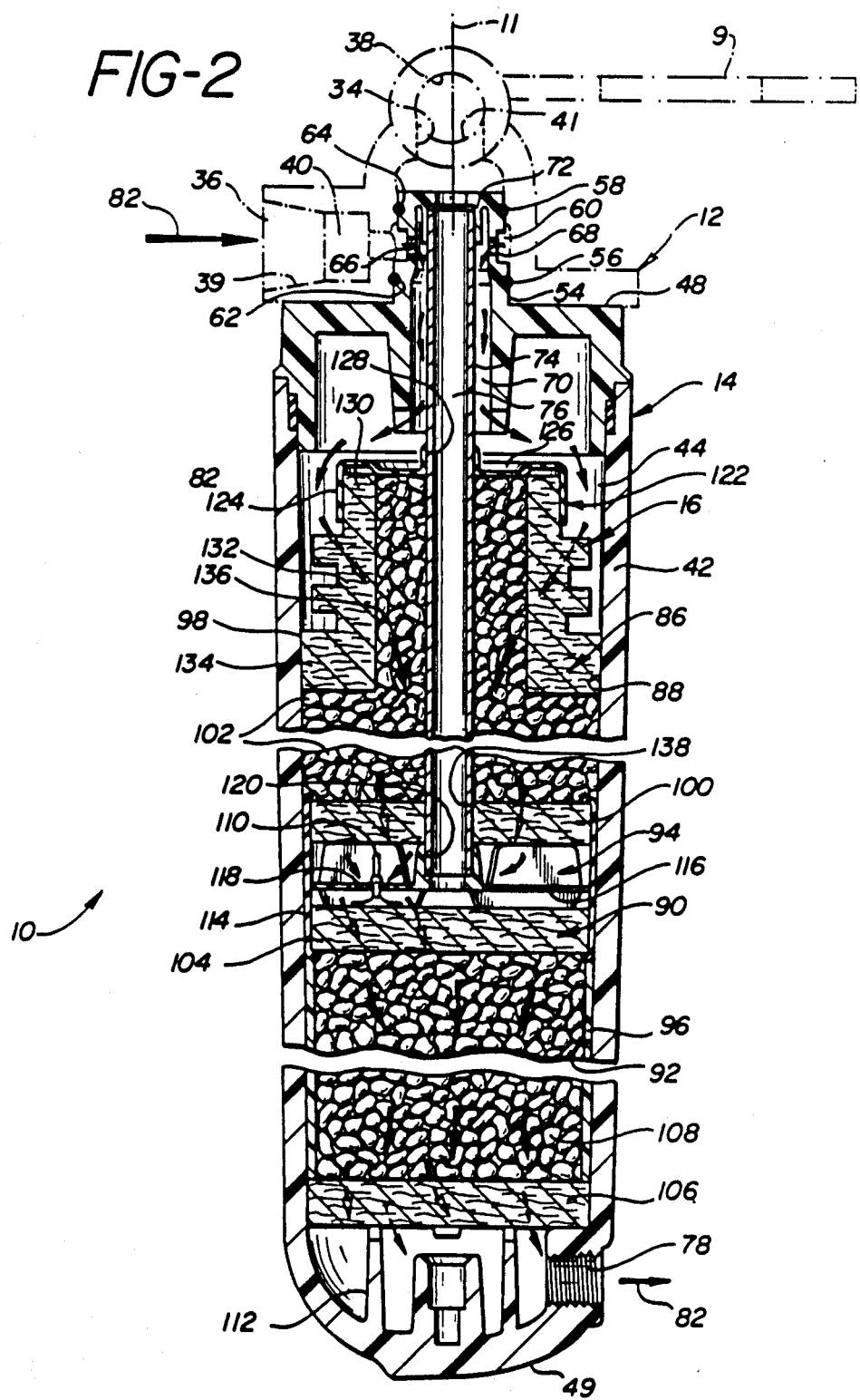
FIG. 2 is a section view as taken along the line 2—2 of FIG. 1 which shows forward fluid flow.

As shown in FIGS. 1, 2 and 3, cartridge 14, which is a disposable cartridge, includes an upper wall 48, and a lower wall 49. Upper wall 48 has a pair of tabs 50, 52, which are received in tab receptacles 22, 24. Upper wall 48 also has a neck portion 54, which supports a lower O-ring seal 56 and an upper O-ring seal 58, that form therebetween a circular passage 60. Seals 56, 58 are received respectively in a lower groove 62 and an upper groove 64. Neck 54 has two, inner, transverse passages 66, 68, which connect to annular inlet passage 70, for forward flow to cavity 44.

Neck 54 is provided with a transverse wall portion 72, which supports a tube 74, that has an outlet passage 76 (FIG. 3). Passage 76 connects to chamber 34, which connects to outlet port 38.

Substantially all of the foregoing structure and elements of this filter apparatus are described in U.S. Pat. No. 4,735,716 to Petrucci, et al., the entire disclosure of which is incorporated herein by reference.

Additionally, however, as shown in FIG. 2, cartridge 14 has a combination inlet and outlet port 78, which has a connector 80 which is preferably in fluid communication with a pressurized storage tank (not shown). Port 78 is an outlet port for forward flow of fluid (FIG. 2) to the storage tank and is an inlet port for reverse flow of fluid (FIG. 3) from the storage tank. Forward flow of fluid, as shown by direction arrows 82, in FIG. 2, enters at inlet port 36 and exits from port 78. Reverse flow, of fluid, as shown by direction arrows 84 in FIG. 3, enters at port 78 and exits from outlet port 38.

As shown in FIGS. 2 and 3, filter assembly 16, which is disposed in cavity 44, includes a primary upper filter unit 86, which is disposed in primary upper chamber 88, and includes a secondary lower filter unit 90, which is disposed in secondary lower chamber 92. Filter assembly 16 also has a check valve subassembly 94, which is fixedly connected to tube 74, and which divides cavity 44 into upper chamber 88 and lower chamber 92. Subassembly 94 is also supported by peripheral wall 42. Filter assembly 16 also has a spacer sleeve 96. Sleeve 96 length sets or controls the length of secondary lower filter unit 90.

Primary upper filter unit 86 includes a primary upper filter media or ring 98 and a primary lower filter media or ring 100. An activated carbon material 102 is disposed between the upper filter media 98 and the lower filter media 100.

Secondary lower filter unit 90 includes a secondary upper filter media or ring 104 and a secondary lower filter media or ring 106. Activated carbon material 108 is also disposed between the upper filter media 104 and the lower filter media 106. Bottom wall 49 has a perforated cylindrical wall portion 112, which supports secondary lower filter media 106.

In FIGS. 2 and 3, valve subassembly 94 has a check valve unit 110, which is shown as open in FIG. 2, and which is shown as closed in FIG. 3. Valve subassembly 94 includes a cylinder or a cylindrical portion 114, which supports filter media pads 100 and 104. Subassembly 94 also has a disc or diaphragm portion 116, which has a plurality of holes 118, disposed over check valve unit 110. Disc 116 has a center bore or hole 120, which receives and attaches to an end portion of tube 74.

Tube 74 also has a cup or annular member 122. Cup 122 has a flange 124, which supports the filter media 98. Cup 122 has a web 126 and a center bore or hole 128, for mounting cup 122 on tube 74.

As shown in FIGS. 2 and 3, filter media 98 has an upper annular portion 130, which is supported by cup flange 124. Filter media 98 also has a middle grooved portion 132, to enhance the surface area of the filter media, and has a lower support portion 134, which is supported by peripheral wall 42. Filter media 98 also has a radial inner surface 136, which contacts activated carbon material 102. Filter pad 100 has a center bore or hole 138, which is mounted on a part of tube 74.

Thus, as shown in FIG. 1, cartridge 14, which has therein the filter assembly 16, is secured to the head 12 by the securing means 15, which has the same construction as the construction of the securing means that is described in prior art U.S. Pat. No. 4,735,716, to Petrucci, et al. The inlet port 36 receives the permeate from a reverse osmosis unit (not shown). The outlet port 38 is connected to a service faucet (not shown). The combination inlet and outlet port 78 is connected to a pressurized storage tank (not shown).

Cartridge or filter housing 14 contains the two independent chambers 88, 92, which have the activated carbon materials 102, 108, and which are separated by the valve subassembly 94. The subassembly 94 has the hole 120, which connects to passage 76 of tube 74, which connects through chamber 34 and through outlet port 38 to the service faucet (not shown). The desired lengths of the carbon materials or beds 102, 108 are determined by the overall length of the cartridge peripheral wall 42 and the length of spacer sleeve 96. The activated carbon material 108 in secondary lower chamber 92 is prevented from leaving the lower end of filter cartridge or housing 14 by means of filter pad 106.

In "forward flow", as shown in FIG. 2, water from the reverse osmosis section (not shown) enters the filter apparatus 10 through inlet port 36, proceeds through the filter part 98 and into the primary carbon chamber 88. The rate of flow in this mode is low enough, e.g. about 15 millimeters per minute, to ensure adequate contact time between the carbon bed 102 and process water to meet chemical reduction requirements. The water proceeds through the filter media 100 and 104 and the secondary carbon chamber 92 and through the filter media 106. Flow exits from the filter apparatus 10 by means of port 78 and proceeds to the pressurized storage tank (not shown).

In "reverse flow", as shown in FIG. 3, when the service faucet (not shown) is opened, water from the pressurized storage tank (not shown) flows back into the filter apparatus 10 through the port 78, for example, at a rate of about 0.5 gallons per minute. The water passes through the secondary chamber 92 and is treated by the carbon material 108 to remove undesirable taste and odor obtained from the storage tank. The water then passes through filter media 104, but is prevented from passing through primary carbon chamber 88 by check valve unit 110. The only remaining route is through the tube 74. The water then flows through passages 76, 34, 41 to the outlet port 38 leading to the service faucet.

In the "forward flow" or accumulating mode, as shown in FIG. 2, due to the low flow rates obtained from the RO module the carbon beds 102 and 108 provide the necessary chemical reduction treatment to the water. The carbon bed 102 in the primary chamber 88 will be exposed first to the impure water and thus retain the greater proportion of contamination. The total contaminants held in the secondary carbon chamber 92 is relatively minor.

The higher reverse flow rate, which occurs during the service mode, as shown in FIG. 3, is restricted to the secondary carbon bed 108 and is subject to relatively little or no recontamination, because of the relatively low level of contamination of the secondary carbon bed 108.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A filter apparatus comprising:
 a head having a forward flow inlet port and a reverse flow outlet port; and
 a filter cartridge;
 said filter cartridge comprising a first end portion secured to the head and a primary chamber in fluid communication with the forward flow inlet port, and a second end portion having a secondary chamber and a combination inlet and outlet port in fluid communication therewith;
 a filter assembly disposed in the cartridge, wherein said filter assembly comprises:
 a primary filter unit disposed in the primary chamber;
 a secondary filter unit disposed in the secondary chamber;
 a tube having on one end a passage opening in fluid communication with the reverse flow outlet port and on the other end a passage opening disposed in the secondary chamber; and
 a valve means disposed between the primary chamber and the secondary chamber for permitting forward flow from the primary chamber to the secondary chamber and for preventing reverse flow from the secondary chamber to the primary chamber;
 the above providing means wherein forward fluid flow through the inlet port flows sequentially through the primary filter unit, the secondary filter unit and out through the combination inlet and outlet port, and reverse fluid flow through the combination inlet and outlet port flows through the secondary filter unit, through the tube and out through the reverse flow outlet port.

2. The apparatus of claim 1, wherein the primary filter unit comprises a primary upper filter media with an axis, a primary lower filter media axially spaced therefrom and a primary activated carbon bed disposed therebetween.

3. The apparatus of claim 2, wherein the secondary filter unit comprises a secondary upper filter media with an axis, a secondary lower filter media axially spaced therefrom and a secondary activated carbon bed disposed therebetween.

4. The apparatus of claim 1, wherein the valve means comprises:
 a diaphragm which separates the primary lower filter media and the secondary upper filter media;
 at least one check valve unit;
 at least one hole disposed in the diaphragm over the check valve unit;
 and a central bore hole mounted on a portion of the tube.

5. The apparatus of claim 1, wherein the cartridge combination inlet and outlet port is in fluid communication with a pressurized fluid storage tank.

6. A filter cartridge for attachment to a head having a forward flow inlet port and a reverse flow outlet port comprising:
 a first end portion adapted to secure to the head and a primary chamber adapted to be in fluid communication with the forward flow inlet port when the cartridge is secured to the head, and a second end portion having a secondary chamber and a combination inlet and outlet port in fluid communication therewith; and
 a filter assembly disposed in the cartridge, wherein said filter assembly comprises:
 a primary filter unit disposed in the primary chamber;
 a secondary filter unit disposed in the secondary chamber;
 a tube having on one end a passage opening in fluid communication with the reverse flow outlet port and on the other end a passage opening disposed in the secondary chamber; and
 a valve means disposed between the primary chamber and the secondary chamber for permitting forward flow from the primary chamber to the secondary chamber and for preventing reverse flow from the secondary chamber to the primary chamber;

the above providing means wherein forward fluid flow through the inlet port flows sequentially through the primary filter unit, the secondary filter unit and out through the combination inlet and outlet port, and reverse fluid flow through the combination inlet and outlet port flows through the secondary filter unit through the tube and out to the reverse flow outlet port.

7. The cartridge of claim 6, wherein the primary filter unit comprises a primary upper filter media with an axis, a primary lower filter media axially spaced therefrom and a primary activated carbon bed disposed therebetween.

8. The cartridge of claim 7, wherein the secondary filter unit comprises a secondary upper filter media with an axis and a secondary lower filter media axially spaced therefrom and a secondary activated carbon bed disposed therebetween.

9. The cartridge of claim 6, wherein the check valve means comprises:
   a diaphragm which separates the primary lower filter media and the secondary upper filter media;
   at least one check valve unit;
   at least one hole disposed in the diaphragm over the check valve unit, and
   a central bore hole mounted on a portion of the tube.

10. A process for purifying impure water to produce purified water comprising:
    passing the impure water through a reverse osmosis module to produce a permeate;
    passing the permeate through a filter cartridge in one direction to produce a filtrate;
    storing said filtrate for a period of time;
    passing the stored filtrate through the filter cartridge in a reverse direction to the direction the permeate passed through the filter cartridge to produce purified water.

11. A process for purifying impure water to produce purified water comprising:
    passing the impure water through a reverse osmosis module to produce a permeate;
    passing the permeate through a filter cartridge, said permeate passing sequentially in one direction through a primary filter unit and a secondary filter unit contained therein, to produce a filtrate;
    storing said filtrate for a period of time;
    passing the stored filtrate through only the secondary filter unit of the filter cartridge to produce purified water.

12. The process of claim 11, wherein passing the stored filtrate through the secondary filter unit is in a reverse direction to the direction the permeate passed through the secondary filter unit.

13. A process for purifying impure water to produce purified water comprising:
    passing the impure water through a first filter cartridge to produce a first filtrate;
    passing the filtrate through a reverse osmosis module to produce a permeate;
    passing the permeate through a second filter cartridge in one direction to produce a second filtrate;
    storing said second filtrate for a period of time;
    passing the stored filtrate only through the second filter cartridge in a reverse direction to the direction the permeate passed through the second filter cartridge to produce purified water.

14. A process for purifying impure water to produce purified water comprising:
    passing the impure water through a first filter cartridge to produce a first filtrate;
    passing the filtrate through a reverse osmosis module to produce a permeate;
    passing the permeate through a second filter cartridge, said permeate passing sequentially in one direction through a primary filter unit and a secondary filter unit contained therein, to produce a second filtrate;
    storing said second filtrate for a period of time;
    passing the stored filtrate through only the secondary filter unit of the second filtration cartridge to produce purified water.

15. The process of claim 14, wherein passing the stored filtrate through the secondary filter unit is in a reverse direction to the direction the permeate passed through the secondary filter unit.

* * * * *